Oct. 26, 1965 H. GRUBER 3,214,197
FLUID-CONVEYING ASSEMBLIES, PARTICULARLY FOR FLUID HEATERS
Filed June 14, 1963 2 Sheets-Sheet 2
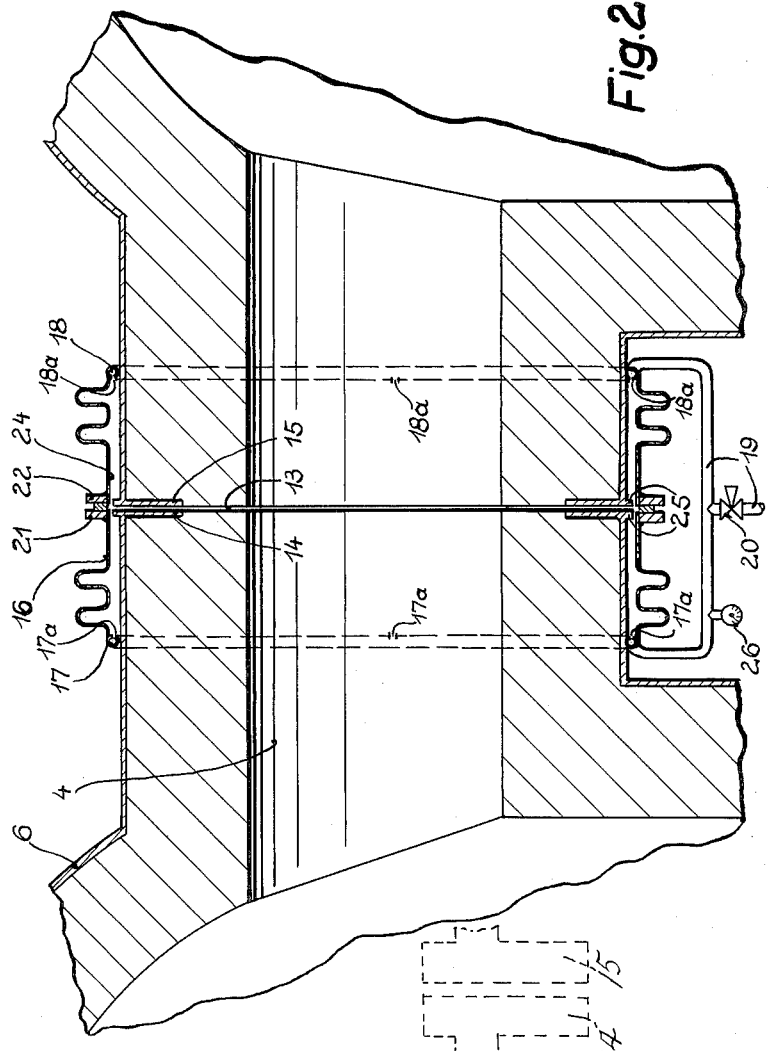
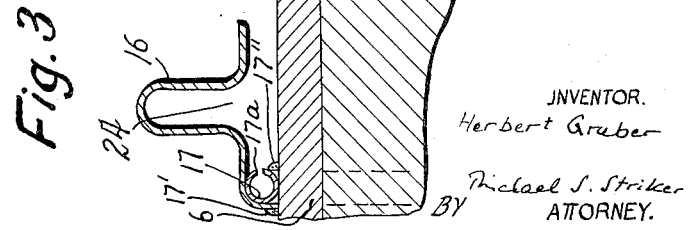
INVENTOR.
Herbert Gruber
BY Michael S. Striker
ATTORNEY.

United States Patent Office 3,214,197
Patented Oct. 26, 1965

3,214,197
FLUID-CONVEYING ASSEMBLIES, PARTICULARLY FOR FLUID HEATERS
Herbert Gruber, Essen, Germany, assignor to Heinrich Koppers G.m.b.H., Essen, Germany
Filed June 14, 1963, Ser. No. 288,005
Claims priority, application Germany, June 18, 1962, K 47,019
1 Claim. (Cl. 285—41)

The present invention relates to fluid-conveying structure, and especially to structure for conveying fluids which are at elevated temperatures.

More particularly, the present invention relates to a structure for providing between a pair of fluid-conveying pipes a connection which will be fluid-tight.

In assemblies of this latter type it is of course necessary to allow for both longitudinal and radial expansion of a pair of substantially coaxial pipes which are in end-to-end relation in order to convey a fluid therethrough. While compensators are known for interconnecting a pair of pipes in such a way that the longitiudnal and radial expansion of one pipe relative to the other can freely take place, conventional compensators cannot maintain a proper connection between such a pair of pipes when the fluid conveyed through the pipes is at an elevated temperature. Thus, a fluid at an exceedingly high temperature will escape through the gap between the pipes to engage the compensator so that the compensator is subjected not only to the stresses and strains resulting from constant radial and longitudinal expansion of the pipes relative to each other but also the compensator is subjected to the severe expansions and contractions resulting from the elevated temperature of the fluid which is conveyed through the pipes, and conventional compensators when operating under such severe conditions soon develop cracks and not only lose their fluid-tightness but in addition result in substantial heat losses.

It is accordingly a primary object of the present invention to provide a fluid-conveying assembly capable not only of withstanding the stresses and strains resulting from longitudinal and radial expansion of one of a pair of pipes with respect to the other, but also capable of withstanding extremely high temperatures so that the structure will not develop undesirable leaks.

Another object of the present invention is to provide for a fluid assembly of the above type a structure which enables the assembly to be maintained at a relatively low temperature in the region of the compensator.

It is furthermore an object of the present invention to provide a structure which will guarantee uniform operating characteristics throughout the structure which serves to interconnect a pair of pipes.

Also, it is an object of the present invention to provide a structure which is capable of indicating when defective operation occurs so that steps may be immediately taken to correct the defective operation.

It is also an object of the present invention to provide a structure of the above type which includes a compensator capable of being easily and quickly exchanged for another compensator, when required, while at the same time being capable of maintaining the operation of a structure to which the compensator is connected substantially without interruption.

The objects of the present invention also include the provision of a structure which is particularly adapted for interconnecting a regenerator and burner of an assembly of the type used in heating air which is to be introduced into a blast furnace.

With these objects in view, the invention includes in a fluid-conveying assembly, a pair of fluid-conveying pipes arranged in end-to-end relation and respectively having a pair of free ends defining a gap between themselves. A flexible compensator surrounds and is spaced from these pipes and extends across the gap between the ends thereof. A pair of connecting means fluid-tightly connect the compensator to the pipes, respectively, at locations spaced from the gap, and a conduit means communicates with the interior of a chamber formed between the compensator and the pipes to supply this chamber with a suitable fluid, which will of course communicate with the gap between the ends of the pipes. Thus, with this construction it is possible to provide in the chamber between the compensator and the pipes a fluid which on the one hand will have a pressure sufficient to prevent flow of fluid from the interior of the pipes through the gap into the chamber and which on the other hand will have a temperature low enough to protect the compensator against the temperature of the fluid which is conveyed through the pipes.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

FIG. 2 is an axial sectional illustration of that part of the structure of FIG. 1, on an enlarged scale as compared to FIG. 1, which includes the structure of the present invention; and FIG. 3 is a detail view, on an enlarged scale, of the connection between elements of the structure shown in FIGS. 1 and 2.

Figure 1:
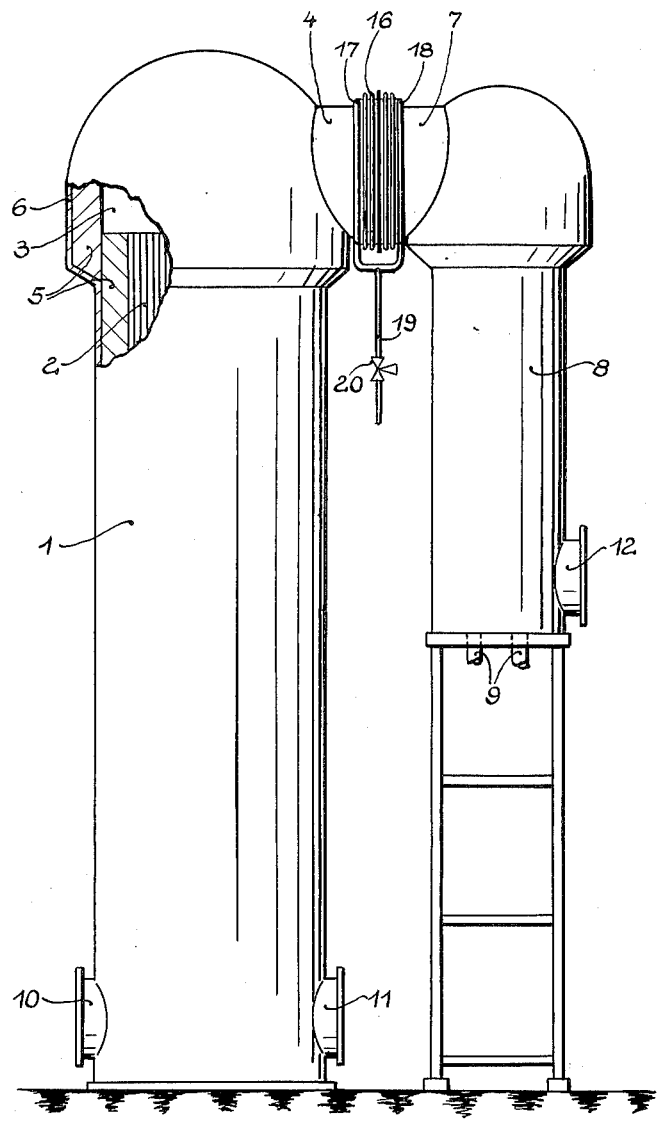
FIG. 1 is a partly sectional, partly schematic illustration of part of a structure for heating air which is to be introduced into a blast furnace, the structure of FIG. 1 including the structure of the present invention.

Referring to FIG. 1, there is shown therein a heater 1 forming a heater means for heating a fluid such as air, this particular heating means 1 being in the form of a regenerator of a blast furnace assembly, and, as is well known in the art, the regenerator 1 includes in its interior a checkerbrick or other heat-exchanging structure 2 which is adapted during the on gas phase of the operation to be heated and during the on wind phase of the operation to give up its heat to the air which is to be heated prior to being introduced into the blast furnace. The heating means 1 includes a dome 3 at its upper end, and this dome 3 has, as an integral extension thereof, a pipe 4 connected thereto and extending therefrom to the right, as viewed in FIG. 1. The heater 1 together with its dome 3 as well as the pipe 4 are formed of a heat-resistant wall 5 made of any suitable firebrick or the like, and the entire structure is clad in a protective metallic covering 6.

A pipe 7 is arranged in end-to-end relation with respect to the pipe 4, and this pipe 7 extends from and forms a part of a burner means 8 which is used to heat the interior of the regenerator 1 during the on gas phase of the operation, as is well known. The lower part of the burner means 8 communicates with a pair of conduits 9 which serve to supply to the interior of the burner means 8 a pair of combustible fluids such as a combustible gas and air, respectively, so that these fluids can be burned within the burner means 8 to provide the heat for heating the checkerbrick 2. During the on gas phase of the operation the heat resulting from combustion in the burner means 8 will provide a flow of heated gas from the burner means 8 through the pipes 7 and 4 into the regenerator 1, this hot gas flowing downwardly through the regenerator 1 and being withdrawn through the discharge 10. At the end of the on gas phase, when the regenerator 1 has been sufficiently heated, it will be switched over in a manner well known in the art to the on wind phase during which the burner means 8 will not operate, and at this time the air which is to be heated is introduced into the regenerator 1 through the inlet 11 to rise upwardly through the regenerator 1 so as to be heated with heat derived from the checkerbrick 2, and the heated air will now flow in the opposite direction from the dome 3 through the pipes 4 and 7 into the burner means 8 to be withdrawn out of the latter through the outlet 12, and this hot air is then introduced into a blast furnace, usually in combination with a suitable amount of unheated air which together with the heated air provide the blast furnace air with the desired temperature.

As is apparent from FIG. 2, the pipes 4 and 7 are both formed from heat-resistant, metal-clad material, and these pipes 4 and 7 are arranged in end-to-end relation and respectively have free ends which define between themselves the gap 13, so that the pipes 4 and 7 are free to expand both longitudinally and radially one with respect to the other. The metal cladding 6 terminates at the ends of the pipes 4 and 7, respectively, in a pair of inwardly directed annular flanges 14 and 15, as shown in FIG. 2.

A flexible, metallic compensator 16 surrounds and is spaced from the pipes 4 and 7 and extends across the gap 13, and a pair of connecting means 17 and 18 fluid-tightly connect the compensator 16 to the pipes 4 and 7, respectively, at locations spaced from the gap 13. The annular tubular members 17 and 18 may, for example, be welded to the metal cladding 6 (as at 17' in FIG. 3) as well as to the metallic compensator 16 (as at 17" in FIG. 3) so as to provide a fluid-tight connection between the compensator and the pipes, and of course due to the flexbility of the metallic compensator 16 the pipes are free to expand both longitudinally and radially one with respect to the other. It is apparent that the pair of connecting means 17, 18 define together with the compensator 16 and the pipes a chamber 24 which communicates through the gap 13 with the interior of the pipes 4 and 7.

It is to be noted that it is only the outer surface portions of the annular, endless, tubular members 17 and 18 which form the connecting means for fluid-tightly connecting the compensator 16 to the pipes. These tubular members 17 and 18 are respectively formed with openings 17a and 18a respectively communicating with the interior of the chamber 24, and thus one or more wall portions of each of the tubes 17 and 18 may be formed with such openings providing communication between the interior of the tubes 17 and 18 and the chamber 24. Thus, the hollow interiors of the tubes 17 and 18 and the wall portions thereof which are formed with the openings which communicate with the chamber 24 form a conduit means communicating with the cahmber 24 for supplying a fluid thereto, and a conduit 19 communicates with this conduit means, the conduit or tube 19 being connected to both of the tubes 17 and 18 at wall portions thereof which are respectively formed with openings through which the interior of the conduit 19 communicates with the interior of the tubes 17 and 18. The conduit 19 can be supplied from any suitable source with a relatively cool fluid, such as air, for example, which thus can be supplied to the interior of the chamber 24. The annular wall portion of the tube 17 which is directed toward the interior of the chamber 24 is preferably formed with a row of openings through which the cooling fluid can pass into the interior of the chamber 24, and in the same way the annular tubular member 18 is formed at its wall portion which is directed toward the chamber 24 with a row of openings through which the cooling fluid from the conduit 19 can also enter into the chamber 24. The pressure of the cooling fluid which is thus introduced into the chamber 24 is preferably maintained only slightly above the pressure of the fluid in the burner means 8 and the heater means 1, so that in this way the silghtly superior pressure of the cooling fluid will prevent the fluid conveyed through the pipes 4 and 7 from escaping through the gap 13 into the chamber 24, and thus this relatively hot fluid in the pipes 4 and 7 cannot have access to the compensator 16.

The flanges 14 and 15 at the ends of the pipes 4 and 7, respectively, extend not only inwardly toward the common axis of the pipes, these flanges also have outwardly directed annular portions 25 which extend from the exterior of the pipes 4 and 7 toward the compensator 16, and thus the fluid flowing into the chamber 24 from the tubular member 17 will engage the left flange 25 of FIG. 2 to be retarded by the latter from flowing freely beyond this left flange, and in the same way the right flange 25 of FIG. 2 will be engaged by the cooling fluid entering through the tube 18 into the chamber 24 to retard the flow of this latter cooling fluid to the left, as viewed in FIG. 2, beyond the right flange 25, so that in this way the pair of outwardly directed flanges 25 serve to uniformly distribute the cooling fluid all around the chamber 24 and thus uniform distribution of the cooling fluid along the inner surface of the compensator 16 is assured.

The pressure of the fluid in the pipes 4 and 7 will fluctuate between the on gas and on wind phases of operation, and in order to adapt the pressure of the fluid in the chamber 24 automatically to the pressure of the fluid in the pipes 4 and 7, an automatic pressure regulator 20 of known construction is connected in unillustrated manner not only with the conduit 19 but also with the interior of the burner means 8 so as to automatically provide in chamber 24 a fluid pressure determined according to the pressure of the fluid in the burner means 8. Thus, it is possible with this construction to automatically maintain the cooling fluid in the chamber 24 at a pressure which is slightly greater than the pressure of the fluid in the pipes 4 and 7.

An indicating means 26 communicates either with the interior of the conduit 19 or in any other way with the interior of the chamber 24 so as to indicate the pressure therein. Thus, the indicating means 26 may take the form of a contact manometer which will not only register the pressure of the fluid in the chamber 24 but which is also capable of indicating this pressure at a suitable observation station distant from the structure shown in FIGS. 1 and 2, and thus the indicating means 26 will indicate any unexpected drop in pressure to give a signal that an unexpected leak has occurred which might require replacement of the compensator 16, for example.

As is apparent from FIG. 2, the compensator 16 includes a pair of separate sections both of which terminate in the region of the gap 13. Thus, it will be seen from FIG. 2 that the sections of the compensator 16 respectively terminate in a pair of flanges 21, and a suitable sealing ring 22 is located between the flanges 21 so as to fluid-tightly close the space therebetween. Any suitable screws or the like are applied to the flanges 21 for pulling them toward each other so as to compress the sealing ring 22 therebetween, and in this way the compensator of the invention has a construction which makes it very easy to replace one compensator for another, if necessary. Thus, if and when it should become necessary to replace a compensator 16, the screws or the like which pull the flanges 21 toward each other are loosened so that these flanges can be separated from each other and the sealing ring 22 removed, whereupon a temporary sealing ring is immediately applied to the gap 13 to maintain the latter closed while one compensator is being replaced by another, so that in this way it is possible to continue the operation of the structure while replacing a compensator. After the old compensator has been removed and a new one has been assembled with the pipes, the temporary, auxiliary sealing ring is removed from the gap 13 and the flanges 21 of the new compensator sections are pulled again toward each other with a sealing ring 22 therebetween, so that now the structure can continue to operate in the usual manner, as described above.

It is to be noted that the structure of the invention maintains in the chamber 24 a cooling fluid, such as air in the case of regenerator assemblies for blast furnaces, and this cooling fluid reliably maintains the compesator at all times at the same low temperature as the cooling fluid itself, so that there will be no additional stresses applied to the compensator 16 as a result of temperature variations, and at the same time heat losses are reliably avoided. By maintaining the pressure of the cooling fluid in the chamber 24 slightly greater than the pressure of the fluid in the pipes 4 and 7, that cooling fluid will slowly flow through the gap 13 into the fluid which passes through the pipes 4 and 7, so that the cooling fluid in the chamber 24 is constantly flowing out of the latter into the pipes, at such a rate as not to undesirably lower the temperature of the fluid in the pipes 4 and 7, but nevertheless at rates sufficient to maintain the fluid in the chamber 24 at a temperature sufficiently low to protect the compensator 16 against undesirable temperature fluctuations.

It will be understood that each of the elements described above, or two or more together, may also find a useful application in other types of fluid-conveying assemblies differing from the types described above.

While the invention has been illustrated and described as embodied in fluid-conveying assemblies, particularly for heating apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

A fluid-conveying assembly comprising, in combination, a pair of pipes located substantially in end-to-end relation and having a pair of free ends, respectively, which define a gap between themselves; a flexible compensator surrounding and spaced from said pipes and extending across said gap; a pair of annular, tubular members surrounding and fluid-tightly fixed to said pipes and also fluid-tightly fixed to said compensator, said tubular members defining with said pipes and compensator an enclosed chamber which communicates with said gap and said tubular members being formed respectively with openings communicating with said chamber; and means communicating with said tubular members for supplying thereto a fluid which flows from the interior of said tubular members through said openings thereof into said chamber so that the pressure of said fluid can oppose the pressure of a fluid conveyed through said pipes to substantially prevent flow of fluid from said pipes through said gap into said chamber and so that the temperature of the fluid in said chamber can be low enough to protect said compensator when the temperature of the fluid in said pipes is so high that such protection is required, and said pipes respectively carrying at their ends annular flanges projecting from said pipes toward said compensator to substantially uniformly distribute the fluid in said chamber all around said pipes.

References Cited by the Examiner

UNITED STATES PATENTS

| | | | |
|---|---|---|---|
| 310,841 | 1/85 | Moeser | 285—13 X |
| 1,323,328 | 12/19 | Slick et al. | 137—340 |
| 2,171,576 | 9/39 | Larry et al. | 137—15 |
| 2,183,596 | 12/39 | Trinks | 285—300 X |
| 2,337,038 | 12/43 | Fentress | 285—41 |
| 2,406,234 | 8/46 | Marancik et al. | 285—299 X |
| 2,437,385 | 3/48 | Halford | 285—227 X |
| 2,510,513 | 6/50 | Mueller et al. | 137—15 |
| 2,986,877 | 6/61 | Emmons et al. | 285—41 X |
| 3,053,554 | 9/62 | Magos et al. | 285—93 X |
| 3,057,646 | 10/62 | Brumagim | 285—41 |
| 3,068,026 | 12/62 | McKamey | 285—227 X |

FOREIGN PATENTS

| | | |
|---|---|---|
| 1,244,446 | 9/60 | France. |
| 539,041 | 11/31 | Germany. |
| 875,931 | 8/61 | Great Britain. |

CARL W. TOMLIN, *Primary Examiner.*

THOMAS F. CALLAGHAN, *Examiner.*